United States Patent [19]

Chino et al.

[11] Patent Number: 6,071,643
[45] Date of Patent: Jun. 6, 2000

[54] BATTERY JAR MATERIAL FOR SEALED SECONDARY BATTERY AND BATTERY JAR FOR SEALED SECONDARY BATTERY USING THE SAME

[75] Inventors: Shinji Chino, Osaka; Nobuyuki Satoh, Tokyo; Koji Matsukawa, Osaka; Akihiko Okada, Ichihara, all of Japan

[73] Assignee: Idemitsu Petrochemical Co., Ltd., Tokyo, Japan

[21] Appl. No.: 09/091,818

[22] PCT Filed: Dec. 27, 1996

[86] PCT No.: PCT/JP96/03855

§ 371 Date: Jun. 25, 1998

§ 102(e) Date: Jun. 25, 1998

[87] PCT Pub. No.: WO97/24771

PCT Pub. Date: Jul. 10, 1997

[30] Foreign Application Priority Data

Dec. 27, 1995 [JP] Japan .................................. 7-340205

[51] Int. Cl.$^7$ .......................... H01M 2/02; C08L 47/00; C08L 51/00; C08L 53/00
[52] U.S. Cl. .......................... 429/176; 524/494; 524/505
[58] Field of Search ............................ 429/176; 524/494, 524/505

[56] References Cited

U.S. PATENT DOCUMENTS

| | | | |
|---|---|---|---|
| 4,703,105 | 10/1987 | Allada | 528/483 |
| 4,764,559 | 8/1988 | Yamauchi et al. | 525/92 D |
| 4,863,996 | 9/1989 | Nakazima et al. | 525/92 B |
| 5,073,620 | 12/1991 | Sanada et al. | 525/68 |
| 5,086,105 | 2/1992 | Abe et al. | 524/492 |
| 5,089,353 | 2/1992 | Negi et al. | 428/518 |
| 5,109,068 | 4/1992 | Yamasaki et al. | 525/151 |
| 5,127,158 | 7/1992 | Nakano | 29/849 |
| 5,165,990 | 11/1992 | Nakano | 428/297.4 |
| 5,166,238 | 11/1992 | Nakano et al. | 524/120 |
| 5,175,211 | 12/1992 | Sanada et al. | 525/66 |
| 5,200,454 | 4/1993 | Nakano | 524/409 |
| 5,219,940 | 6/1993 | Nakano | 525/133 |
| 5,270,353 | 12/1993 | Nakano et al. | 523/214 |
| 5,280,066 | 1/1994 | Tekkanat et al. | 525/64 |
| 5,326,813 | 7/1994 | Okada et al. | 524/508 |
| 5,346,950 | 9/1994 | Negi et al. | 525/57 |
| 5,352,727 | 10/1994 | Okada | 524/495 |
| 5,391,611 | 2/1995 | Funayama et al. | 524/508 |
| 5,395,890 | 3/1995 | Nakano et al. | 525/165 |
| 5,412,024 | 5/1995 | Okada et al. | 524/577 |
| 5,418,275 | 5/1995 | Okada et al. | 524/504 |
| 5,418,276 | 5/1995 | Michida et al. | 524/504 |
| 5,436,397 | 7/1995 | Okada | 524/494 |
| 5,444,126 | 8/1995 | Okada et al. | 525/391 |
| 5,543,462 | 8/1996 | Okada et al. | 525/74 |
| 5,645,603 | 7/1997 | Peters | 623/20 |
| 5,722,482 | 3/1998 | Buckley | 165/10 |
| 5,754,338 | 5/1998 | Wilson et al. | 359/530 |
| 5,779,962 | 7/1998 | Andraschko et al. | 264/210.1 |
| 5,891,951 | 4/1999 | Nakano et al. | 524/847 |
| 5,902,850 | 5/1999 | Chino et al. | 524/494 |

*Primary Examiner*—Yogendra Gupta
*Assistant Examiner*—Christine Ingersoll
*Attorney, Agent, or Firm*—Oblon, Spivak, McClelland, Maier & Neustadt, P.C.

[57] ABSTRACT

A battery jar material for sealed secondary batteries comprising a resin composition which comprises 50 to 98% by weight of (A) a styrenic polymer having a syndiotactic configuration, 2 to 50% by weight of (B) at least one polymer selected from the group consisting of polyolefins and styrenic elastomers, and 0 to 10% by weight of (C) a polyphenylene ether, or a resin composition which comprises 100 parts by weight of a resin component having the same composition as the above resin composition, 1 to 350 parts by weight of (D) an inorganic filler, and 0 to 5 parts by weight of (E) a polyphenylene ether modified with a polar group; and a battery jar for sealed secondary batteries made of this material. A battery jar material and a battery jar for sealed secondary batteries which show excellent heat resistance, resistance to electrolytes, resistance to oil and grease, electric insulation, mechanical strengths, and moldability and enable decrease in thickness are provided.

10 Claims, No Drawings

BATTERY JAR MATERIAL FOR SEALED SECONDARY BATTERY AND BATTERY JAR FOR SEALED SECONDARY BATTERY USING THE SAME

TECHNICAL FIELD

The present invention relates to a battery jar material for sealed secondary batteries and a battery jar for sealed secondary batteries made of said material. More particularly, the present invention relates to a battery jar material for sealed secondary batteries which comprises a styrenic polymer having the syndiotactic configuration as the main component, has a light weight, shows excellent heat resistance, chemical resistance, solvent resistance, mechanical strengths, electric insulation, and moldability, and enables decrease in thickness and a battery jar made of said material.

BACKGROUND ART

Unlike primary batteries, secondary batteries have the function of generating electric energy repeatedly after charge. Lead batteries are known as typical examples of the secondary battery. In lead batteries, lead oxide, lead, and sulfuric acid are used as the active substance at the anode, the active substance at the cathode, and the electrolyte, respectively. Lead batteries are widely used in industrial products, such as automobiles, battery fork lift trucks, emergency power sources, and UPS (alternating current unperturbed power supplies), and as batteries in household use, such as small sealed lead batteries. Because of the economic advantage, lead batteries are also used as the power source of electric automobiles which are expected to become popular as vehicles causing no environmental pollution.

On the other hand, as batteries become smaller and lighter and also as portable instruments are widely used, demand for sealed alkali secondary batteries, particularly nickel-cadmium secondary batteries, is increasing as a back-up power source for instruments related to information processing and a power source for portable electric instruments. Recently, nickel-hydrogen secondary batteries and lithium ion secondary batteries are also in the stage of practical application. The sealed alkali secondary batteries are expected to be used increasingly as the battery for electric automobiles.

In the sealed secondary batteries such as those described above, a battery jar which contains an electrolyte of an acid or an alkali and electrodes is indispensable. A battery jar is required to have resistance to electrolytes, i.e., resistance to acids and alkalis; resistance to solvents, i.e., resistance to oil and grease; resistance to heat and pressure which is necessary for remaining stable at increased temperatures caused by heat of chemical reactions at the time of charge and discharge and at increased inner pressures caused by generation of gases; mechanical strengths which are necessary for sufficiently withstanding impact from the outside; electric insulation; and a light weight which is necessary for producing a smaller and lighter battery.

Heretofore, metals have been used as the battery jar material for sealed secondary batteries. However, although battery jars made of a metal have advantages in large mechanical strengths and good heat resistance, pressure resistance, and solvent resistance, these battery jars have drawbacks in that they show inferior chemical resistance and poor electric insulation, require complicated working because welding is necessary, and have heavy weights. Therefore, application of various types of plastics, such as polystyrene, polypropylene, ABS resins, AS resins, poly-4-methylpentene-1, and blends of HIPS and a polyphenylene ether, as the battery jar material has been attempted (the specifications of Japanese Patent Application Laid-Open No. Showa 64(1989)-65771, Japanese Patent Application Laid-Open No. Showa 57(1982)-19965, Japanese Patent Application Laid-Open No. Heisei 6(1994)-231738, and Japanese Patent Application Laid-Open No. Heisei 6(1994)-203814). Although battery jars made of these plastics have advantages in that they have light weights and show easy working and good electric insulation, these battery jars have following drawbacks and are not always satisfactory. For example, battery jars made of polystyrene or an ABS resin show insufficient heat resistance, pressure resistance, and solvent resistance. Battery jars made of polypropylene show insufficient heat resistance, pressure resistance, and solvent resistance at high temperatures. Battery jars made of poly-4-methylpentene-1 show insufficient strengths at high temperatures and solvent resistance. Battery jars made of a blend of HIPS and a polyphenylene ether show insufficient solvent resistance.

DISCLOSURE OF THE INVENTION

The present invention has an object to improve the drawbacks of conventional battery jars made of plastics and to provide a battery jar material for sealed secondary batteries which comprises a plastics, shows excellent electric insulation, heat resistance, and pressure resistance, exhibits excellent solvent resistance and mechanical strengths at high temperatures, and can be easily molded to enable decrease in thickness, and a battery jar for sealed secondary batteries made of this material.

As the result of extensive studies by the present inventors, it was found that the above object can be achieved by a material comprising specific amounts of a resin composition which comprises a styrenic polymer having the syndiotactic configuration, a polyolefin or a styrenic elastomer, and a polyphenylene ether which is used optionally, or a material comprising a resin composition which comprises specific amounts of a resin component having the same composition as the above resin composition, an inorganic filler, and a polyphenylene ether modified with a polar group which is used optionally. The present invention has been completed on the basis of this knowledge.

Accordingly, the present invention provides a battery jar material for sealed secondary batteries comprising a resin composition which comprises 50 to 98% by weight of (A) a styrenic polymer having a syndiotactic configuration, 2 to 50% by weight of (B) at least one polymer selected from the group consisting of polyolefins and styrenic elastomers, and 0 to 10% by weight of (C) a polyphenylene ether. The present invention also provides a battery jar material for sealed secondary batteries comprising a resin composition which comprises 100 parts by weight of a resin component comprising 50 to 98% by weight of (A) a styrenic polymer having a syndiotactic configuration, 2 to 50% by weight of (B) at least one polymer selected from the group consisting of polyolefins and styrenic elastomers, and 0 to 10% by weight of (C) a polyphenylene ether; 1 to 350 parts by weight of (D) an inorganic filler; and 0 to 5 parts by weight of (E) a polyphenylene ether modified with a polar group.

The present invention further provides a battery jar for sealed secondary batteries which is made of a material described above and does not show change in the shape under any of a condition of 60° C. and an inner pressure of 2 kg/cm$^2$ and a condition of 100° C. and an inner pressure of 1 kg/cm$^2$.

THE MOST PREFERRED EMBODIMENT TO CARRY OUT THE INVENTION

In the resin composition comprised in the battery jar material of the present invention, a styrenic polymer having the syndiotactic configuration is used as component (A). The syndiotactic configuration of the styrenic polymer means that the stereochemical structure has a highly syndiotactic configuration. In other words, phenyl groups and substituted phenyl groups of the side groups are alternately placed at the opposite positions with respect to the main chain formed with the carbon-carbon bonds. The tacticity in the stereochemical structure is quantitated by the measurement of the nuclear magnetic resonance using an isotope of carbon ($^{13}$C-NMR). The tacticity measured by the $^{13}$C-NMR method can show the content of a sequence in which a specific number of the constituting units are bonded in sequence, such as a diad in which two constituting units are bonded in sequence, a triad in which three constituting units are bonded in sequence, and a pentad in which five constituting units are bonded in sequence. In the present invention, "the styrenic polymer having the syndiotactic configuration" means polystyrene, a poly(alkylstyrene), a poly(halogenated styrene), a poly(alkoxystyrene), a poly(vinylbenzoic acid ester), a mixture of these polymers, or a copolymer containing constituting units of these polymers as the main components, which generally has a syndiotacticity of 85% or more, expressed in terms of the content of the racemic diad, or 35% or more, preferably 50% or more, expressed in terms of the content of the racemic pentad. Examples of the poly(alkylstyrene) include poly(methylstyrene), poly(ethylstyrene), poly(isopropylstyrene), poly(tertiary-butylstyrene), and the like. Examples of the poly(halogenated styrene) include poly(chlorostyrene), poly(bromostyrene), and the like. Examples of the poly(alkoxystyrene) include poly(methoxystyrene), poly(ethoxystyrene), and the like.

The molecular weight and the molecular weight distribution of the styrenic polymer having the syndiotactic configuration (occasionally referred to as SPS, hereinafter) are not particularly limited, and polymers having a molecular weight of 30,000 or more, preferably 50,000 to 2,000,000, can be used. The amount of the residual styrene monomer is preferably 5,000 ppm or less. This styrenic polymer has a melting point of 260 to 270° C. and exhibits remarkably superior heat resistance and solvent resistance to those of conventional styrenic polymers having the atactic configuration.

In the present invention, SPS of component (A) may be used singly or as a combination of two or more types.

In the battery jar material of the present invention, a polyolefin or a styrenic elastomer is used as component (B) of the resin composition. Examples of the polyolefin include polyethylene, polypropylene, polybutene, polypentene, ethylene-vinyl acetate copolymers, ethylene-vinyl alcohol copolymers, chlorinated polyethylene, ethylene-propylene rubber (EPR), ethylene-propylene-diene rubber (EPDM), and the like.

The styrenic elastomer is not particularly limited. Examples of the styrenic elastomer include styrene-butadiene block copolymer rubber (SBR), styrene-butadiene-styrene block copolymers (SBS), hydrogenated styrene-butadiene-styrene block copolymers (SEBS), styrene-isoprene block copolymers (SIR), styrene-isoprene-styrene block copolymers (SIS), hydrogenated styrene-isoprene-styrene block copolymers (SEPS), hydrogenated styrene-butadiene block copolymers (SEB), hydrogenated styrene-isoprene block copolymers (SEP), hydrogenated styrene-butadiene-ethylene block copolymers (SEBC), methyl acrylate-butadiene-styrene copolymer rubber, acrylonitrile-butadiene-styrene copolymer rubber, methyl acrylate-2-ethylhexyl acrylate-styrene copolymer rubber, elastomers obtained by modification of these polymers, and the like.

Among these polyolefins and styrenic elastomers, polypropylene, polyethylene, EPR, EPDM, SEBS, SEBC, and SEPS are particularly preferable. In the present invention, a single type or a combination of two or more types suitably selected from the above polyolefins and styrenic elastomers may be used as component (B). When a polyolefin is used, it is advantageous for increasing compatibility that a combination including the above styrenic elastomer is used.

In the resin composition comprised in the battery jar material of the present invention, a polyphenylene ether may be comprised as component (C), where necessary. The polyphenylene ether itself is a known material (the specifications of U.S. Pat. No. 3,306,874, U.S. Pat. No. 3,306,875, U.S. Pat. No. 3,257,357, and U.S. Pat. No. 3,257,358) and generally produced by oxidative coupling reaction in the presence of a copper-amine complex and one or more types of di- or tri-substituted phenol to form a homopolymer or a copolymer. As the copper-amine complex, a copper-amine complex derived from a primary, secondary, and/or tertiary amine can be used. Examples of the polyphenylene ether which can be suitably used include poly(2,3-dimethyl-6-ethyl-1,4-phenylene ether), poly(2-methyl-6-chloromethyl-1,4-phenylene ether), poly(2-methyl-6-hydroxydiethyl-1,4-phenylene ether), poly(2-ethyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2-(4'-methylphenyl)-1,4-phenylene ether], poly(2-bromo-6-phenyl-1,4- phenylene ether), poly(2-methyl-6-phenyl-1,4-phenylene ether), poly(2-phenyl-1,4-phenylene ether), poly(2-chloro-1,4-phenylene ether), poly(2-methyl- 1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), poly(2,6-dimethyl-1,4-phenylene ether), and the like.

Further examples of the polyphenylene ether include copolymers derived from two or more types of phenol compounds used for production of the above homopolymers and graft and block copolymers of the above polyphenylene ethers with vinylaromatic compounds, such as styrene. Among these polyphenylene ethers, poly(2,6-dimethyl-1,4-phenylene ether) is particularly preferable.

The polyphenylene ether of component (C) may be used singly or as a combination of two or more types.

As for the relative amounts of the above components in the resin composition comprised in the battery jar material of the present invention, component (A) is used in an amount in the range of 50 to 98% by weight of the total amount of component (A), component (B), and component (C) described above. When the amount of component (A) is less than 50% by weight, heat resistance is insufficient, and, when a battery jar is prepared by using a material which comprises a resin composition comprising component (A) in such an amount, retention of the shape of the battery jar under the condition of 60° C. and 2 atm or the condition of 100° C. and 1 atm is difficult (the temperature at the time of rapid charge: about 60° C.; the maximum temperature during driving of an electric automobile on outdoor surfaces: about 100° C.; and the maximum increase in the inner pressure caused by increase in the amount of generated gases: about 2 atm). Moreover, solvent resistance tends to be decreased. When the amount of component (A) exceeds 98% by weight, toughness is decreased. From the standpoint of the balance between heat resistance, solvent resistance, and toughness, the preferable amount of component (A) is selected in the range of 60 to 95% by weight. The amount of component (B) is in the range of 2 to 50% by weight. When the amount of component (B) is less than 2% by weight, toughness is insufficient. When the amount of component (B) exceeds 50% by weight, heat resistance is decreased and, when a battery jar is prepared by using a material which comprises a resin composition comprising component (A) in such an amount, retention of the shape of the battery jar under the condition of 60° C. and 2 atm or the condition of 100° C. and 1 atm is difficult. From the standpoint of toughness and heat resistance, the preferable amount of component (B) is selected in the range of 5 to 40% by weight. The amount of component (C) is in the range of 0 to 10% by weight. When the amount of component (C) exceeds 10% by weight, moldability is decreased.

In the resin composition comprised in the battery jar material of the present invention, an inorganic filler may be comprised as component (D), where necessary. The inorganic filler is comprised in the resin composition to improve heat resistance, rigidity, surface smoothness, and electric properties of SPS. Moreover, the coefficient of linear expansion of the resin composition can be decreased by addition of an inorganic filler, and stress formed by change in temperature is decreased to suppress formation of cracks. The type of the inorganic filler is not particularly limited. An inorganic filler can be used without particular treatment or with a surface treatment with a coupling agent. The shape of the inorganic filler is not particularly limited and may be any of fibers, granules, and powder. Examples of the inorganic filler having a fiber shape include glass fibers, wiskers, ceramic fibers, metal fibers, and the like. Examples of the wisker include wiskers of boron, alumina, silica, and carbon silicate. Examples of the ceramic fiber include fibers of gypsum, potassium titanate, magnesium sulfate, magnesium oxide, and the like. Examples of the metal fiber include fibers of copper, aluminum, steel, and the like. Among these fibers, glass fibers are particularly preferable. The inorganic filler may have a form of a cloth, a mat, a cut bundle, short fibers, filaments, wiskers, or the like. When the inorganic filler has a form of a cut bundle, it is preferred that the length is 0.05 to 50 mm, and the diameter of the fiber is 5 to 20 $\mu$m.

Examples of the inorganic filler having a granular shape or a powder shape include talc, carbon black, graphite, titanium dioxide, silica (fused silica and crystalline silica), mica, calcium carbonate, calcium sulfate, barium carbonate, magnesium carbonate, magnesium sulfate, barium sulfate, oxysulfate, tin oxides, alumina, kaolin, silicon carbide, metal powders, glass powder, glass flakes, glass beads, and the like. Among these inorganic fillers, talc, calcium carbonate, and mica are particularly preferable. The average diameter of talc is preferably 0.3 to 20 $\mu$m, more preferably 0.6 to 10 $\mu$m. The average diameter of calcium carbonate is preferably 0.1 to 20 $\mu$m. The average diameter of mica is preferably 40 to 250 $\mu$m, more preferably 50 to 150 $\mu$m.

Among these various types of filler, glass fillers, such as glass powder, glass flakes, glass beads, glass filaments, glass fibers, glass rovings, glass mats, and the like, are particularly preferable.

A coupling agent for the surface treatment is used to improve the adhesion between the inorganic filler described above and the resin component and can be selected as desired from conventional coupling agents, such as silane coupling agents, titanium coupling agents, and the like. Specific examples of the silane coupling agent include triethoxysilane, vinyltris($\beta$-methoxyethoxy)silane, $\gamma$-methacryloxypropyltrimethoxysilane $\gamma$-glycidoxypropyltrimethoxysilane, $\beta$-(1,1-epoxycyclohexyl)ethyltrimethoxysilane, N-$\beta$-(aminoethyl)-$\gamma$-aminopropyltrimethoxysilane, N-$\beta$-(aminoethyl)-$\gamma$-aminopropylmethyldimethoxysilane, $\gamma$-aminopropyltriethoxysilane, N-phenyl-$\gamma$-aminopropyltrimethoxysilane, $\gamma$-mercaptopropyltrimethoxysilane, $\gamma$-chloropropyltrimethoxysilane, $\gamma$-aminopropyltrimethoxysilane, $\gamma$-aminopropyl-tris(2-methoxyethoxy)silane, N-methyl-$\gamma$-aminopropyltrimethoxysilane, N-vinylbenzyl-$\gamma$-aminopropyltriethoxysilane, triaminopropyltrimethoxysilane, 3-ureidopropyltrimethoxysilane, 3-4,5-dihydroimidazolepropyltriethoxysilane, hexamethylsilazane, N,N-bis(trimethylsilyl)urea, and the like. Among these compounds, aminosilanes and epoxysilanes, such as $\gamma$-aminopropyltriethoxysilane, N-$\beta$-(aminoethyl)-$\gamma$-aminopropyltrimethoxysilane, $\gamma$-glycidoxypropyltrimethoxysilane, $\beta$-(3,4-epoxycyclohexyl)ethyltrimethoxysilane, and the like, are preferable. Aminosilanes described above are particularly preferable.

Specific examples of the titanium coupling agent include isopropyl triisostearoyl titanate, isopropyl tridodecylbenzenesulfonyl titanate, isopropyl tris(dioctyl pyrophosphate) titanate, tetraisopropyl bis(dioctyl phosphite)titanate, tetraoctyl bis(ditridecyl phosphite)titanate, tetra(1,1-diallyloxymethyl-1-butyl)bis(ditridecyl)phosphite titanate, bis(dioctyl pyrophosphate)oxyacetate titanate, bis(dioctyl pyrophosphate)ethylene titanate, isopropyl trioctanoyl titanate, isopropyl dimethacryl isostearoyl titanate, isopropyl isostearoyl diacryl titanate, isopropyl tri(dioctyl phosphate)titanate, isopropyl tricumyl phenyl titanate, isopropyl tri(N-amidoethyl, aminoethyl)titanate, dicumyl phenyloxy acetate titanate, diisostearoyl ethylene titanate, and the like. Among these compounds, isopropyl tri(N-amidoethyl, aminoethyl)titanate is preferable.

The surface treatment of the above filler with the above coupling agent can be conducted in accordance with a conventional process, and the process is not particularly limited. A suitable process can be selected in accordance with the shape of the filler, for example, from the sizing treatment in which the filler is coated with a solution of the above coupling agent in an organic solvent or with a suspension of the above coupling agent, i.e., with the so-called sizing agent; the dry mixing process using a Henschel mixer, a super mixer, a Redige mixer, or a V-type mixer; the spraying process; the integral blending process; the dry concentrate process; and the like. The sizing treatment, the dry mixing process, and the spraying process are preferable among these processes.

A film forming substance for glass may be used in combination with the above coupling agent. The film forming substance is not particularly limited. Examples of the film forming substances include polymers such as polyesters, polyurethanes, epoxy polymers, acrylic polymers, vinyl acetate polymers, isocyanate polymers, and the like.

The inorganic filler of component (D) may be used singly or as a combination of two or more types. The amount of the inorganic filler is selected in the range of 1 to 350 parts by weight based on 100 parts by weight of the resin component comprising component (A), component (B), and component (C) in the above relative amounts. When the amount is less than 1 part by weight, the effect of the inorganic filler is not sufficiently exhibited. When the amount exceeds 350 parts by weight, a drawback arises in that fluidity of the composition is decreased to cause difficulty in molding. From the standpoint of the balance between improvement in physical properties and moldability, the amount of the inorganic filler is preferably 5 to 200 parts by weight, more preferably 10 to 100 parts by weight.

In the resin composition used as the battery jar material of the present invention, where necessary, a polyphenylene ether modified with a polar group can be comprised as component (E) in combination with the inorganic filler of component (D) to increase adhesion between the inorganic filler and the resin component described above. The polyphenylene ether modified with a polar group is a polyphenylene ether having a polar group introduced into the molecule. Examples of the polar group include acids, acid halides, carbonyl group, acid anhydrides, acid amides, carboxylic esters, acid azides, sulfonic acid group, nitrile group, cyano group, isocyanic ester groups, amino groups, hydroxyl group, imido groups, thiol group, oxazoline groups, epoxy group, and the like. Among these polar groups, acids and acid anhydrides are preferable, and maleic anhydride group is more preferable.

The polyphenylene ether modified with a polar group can be produced, for example, in accordance with (1) a process in which a polyphenylene ether is reacted with a compound having both polar group and unsaturated group, (2) a process in which one or more types of phenolic compound having a polar group are polymerized, (3) a process in which one or more types of phenolic compound having a polar group are copolymerized with a phenolic compound having no polar groups, and the like. Among these processes, process (1) is preferable because the modification can be conducted efficiently in accordance with simple procedures.

In process (1), the polyphenylene ether used for the modification is not particularly limited. Polymers described above as component (C) can be used, and poly(2,6-dimethyl-1,4-phenylene ether) is particularly preferable. Examples of the compound having both polar group and unsaturated group, i.e., a modifier, include maleic acids, such as maleic anhydride, maleic acid, maleic esters, maleimide, N-substituted maleimides, maleic salts, and the like; fumaric acids, such as fumaric acid, fumaric esters, fumaric salts, and the like; itaconic acids, such as itaconic anhydride, itaconic acid, itaconic esters, itaconic salts, and the like; derivatives of acrylic acid, such as acrylic acid, acrylic esters, acylamide, acrylic salts, and the like; and derivatives of methacrylic acid, such as methacrylic acid, methacrylic esters, methacrylamide, methacrylic salts, glycidyl methacrylate, and the like. Among these compounds, maleic anhydride, fumaric acid, fumaric esters, and glycidyl methacrylate are preferable. The modifier may be used singly or as a combination of two or more types.

The polyphenylene ether modified with a polar group can be obtained by reacting a polyphenylene ether with the above modifier, for example, in the presence or absence of a solvent or another resin. The process for the modification is not particularly limited, and a conventional process can be used. Examples of the conventional process include a process in which the reaction is allowed to proceed by melt kneading the above components at a temperature in the range of 150 to 350° C. using roll mills, a Banbury mixer, an extruder, or the like and a process in which the reaction is allowed to proceed by heating the above components in a solvent, such as benzene, toluene, and xylene. It is effective for facilitating the reaction that a radical generating agent, such as benzoyl peroxide, di-t-butyl peroxide, dicumyl peroxide, t-butyl peroxybenzoate, azobisisobutyronitrile, azobisisovaleronitrile, 2,3-diphenyl-2,3-dimethylbutane, or the like, is present in the reaction system. Among these processes, the process in which the reaction is allowed to proceed by melt kneading the components in the presence of a radical generating agent is preferable.

Among the polyphenylene ethers modified with a polar group which are obtained as described above, polyphenylene ethers modified with maleic acid, polyphenylene ethers modified with fumaric acid, and polyphenylene ethers modified with a fumaric ester are preferable. It is sufficient that the content of the polar group is 0.01% by weight or more of the polyphenylene ether. When the content is less than 0.01% by weight, the effect of increasing adhesion between the inorganic filler and the resin component is not sufficiently exhibited. The preferable content of the polar group is in the range of 0.05 to 10% by weight.

The polyphenylene ether modified with a polar group of component (E) may be used singly or as a combination of two or more types. The amount is selected in the range of 0 to 5 parts by weight per 100 parts by weight of the resin component comprising component (A), component (B), and component (C) in the above relative amounts. When the amount exceeds 5 parts by weight, heat resistance and moldability of the material tend to be decreased.

In the resin composition used as the battery jar material of the present invention, various additives, such as flame retardants, auxiliary flame retardants, stabilizers, antioxidants, light stabilizers, lubricants, plasticizers, antistatic agents, mold releases, coloring agents, and the like, and other thermoplastic resins may be comprised within the range that the objects of the present invention are not adversely affected.

As the above flame retardant, various flame retardants can be used, and flame retardants containing halogen and flame retardants containing phosphorus are preferable. Examples of the flame retardant containing halogen include tetrabromophthalic anhydride, hexabromocyclododecane, tetrabromobutane, pentachloropentacyclodecane, hexachlorobenzene, pentachlorotoluene, tetrachlorobisphenol A, oligomers of tetrachlorobisphenol A, halogenated epoxy compounds, polychlorostyrenes, tris(2,3-dibromopropyl)phosphate, tris(2-chloro-3-bromopropyl) phosphate, and the like. Further examples include brominated aromatic compounds, such as tetrabromobisphenol A; hexabromobenzene; tribromophenyl allyl ether; pentabromotoluene; pentabromophenol; tribromophenyl 2,3-dibromopropyl ether; octabromodiphenyl ether; decabromodiphenyl ether; octabromobiphenyl; hexabromobiphenyl; decabromobiphenyl; hexabromodiphenyl ether; ethylene-bis (tetrabromophthalimide); oligomers of tetrabromobisphenol A; oligomers of halogenated polycarbonates, such as oligomers of brominated polycarbonates and the like; brominated polystyrenes, such as polytribromostyrene, brominated syndiotactic polystyrene, and the like; brominated diphenyl ethers, such as poly(dibromophenylene oxide) and the like; and brominated diphenylalkanes, such as bis (tribromophenoxy)ethane and the like.

Examples of the flame retardant containing phosphorus include ammonium phosphate, tricresyl phosphate, triethyl phosphate, various types of phosphoric esters, triphenyl phosphenoxide, and the like.

Among these flame retardants, polytribromostyrene, poly (dibromophenylene oxide), decabromodiphenyl ether, bis (tribromophenoxy)ethane, ethylene-bis (tetrabromophthalimide), tetrabromobisphenol A, and oligomers of brominated polycarbonates are preferable.

Examples of the auxiliary flame retardant include auxiliary flame retardants containing antimony, such as antimony trioxide, antimony pentaoxide, sodium antimonate, metallic antimony, antimony trichloride, antimony pentachloride, antimony trisulfide, antimony pentasulfide, and the like. Further examples include zinc borate, barium metaborate, zirconium oxide, and the like. Among these auxiliary flame retardants, antimony trioxide is preferable.

Examples of the stabilizer include hydrotalcites represented by general formula (I):

$$Mg_{1-x}Al_x(OH)_2A_{x/n}{}^{n-}\cdot mH_2O \qquad (I)$$

wherein $A^{n-}$ represents an n-valent anion, x represents a number satisfying $0<x<0.5$, preferably $0.2 \leq x \leq 0.4$, and m represents a number satisfying $0<m<1$. Preferable examples of the above n-valent anion represented by $A^{n-}$ include $CO_3{}^{2-}$, $HPO_4{}^{2-}$, $SO_4{}^{2-}$, $OH^-$, and the like.

Among these hydrotalcites, hydrotalcites having a BET specific surface area of 30 m²/g or less, preferably 20 m²/g or less, more preferably 15 m²/g, are advantageously used. The preferable hydrotalcites have small diameters of secondary grains because crystals are sufficiently grown with little strains and show excellent dispersion in thermoplastic resins. Therefore, there is no possibility that the hydrotalcites adversely affect physical properties and moldability of the resin composition. Moreover, the hydrotalcites effectively exhibit the function of trapping halogens uniformly in the resin composition, and disadvantageous interactions with other additives are absent. Therefore, troubles such as yellowing of the resin by reaction with antioxidants do not arise. The grain diameter is preferably 0.1 to 1 μm. The average diameter of secondary grains is 5 μm or less, for example 0.1 to 5 μm, preferably 1 μm or less.

Moreover, as the hydrotalcite, hydrotalcites having diameters of crystal grains in the <003> direction, which is measured by X-ray diffraction, of 600 Å or more, preferably 1,000 Å or more, are advantageously used. Conventionally available hydrotalcites have BET specific surface areas of 50 m²/g or more, average diameters of secondary grains of 10 μm or more, and diameters of crystal grains in the <003> direction of 300 Å or less. Hydrotalcites having excessively large BET specific surface areas, such as those exceeding 30 m²/g, are not effective. Hydrotalcites having a BET specific surface area of 30 m²/g or less are effective as the stabilizer. Hydrotalcites which have a BET specific surface area of 30 m²/g or less in combination with a diameter of secondary grains and a diameter of crystal grains in the <003> direction satisfying the above conditions are remarkably effective.

When the hydrotalcites are treated on the surface, compatibility with resins, dispersion, and the coloring property can be further improved. Examples of the agent used for the surface treatment include anion surfactants, silane coupling agents, titanate coupling agents, and esters of higher fatty acids. The surface treatment agent is used in an amount of 0.1 to 10 parts by weight per 100 parts by weight of the hydrotalcite.

Examples of the stabilizer other than the above hydrotalcites include (a), boric acids, boric anhydrides, and metal salts of boric acids containing salts of metals of Group II or Group IV of the Periodic Table and (b) zeolites and zeolites containing metals of Group II or Group IV of the Periodic Table.

Boric acids and boric anhydrides are not particularly limited, and any of orthoboric acid, metaboric acid, tetraboric acid, diboron dioxide, diboron trioxide, tetraboron trioxide, and tetraboron pentaoxide can be used. These compounds may be used singly or as a combination of two or more types.

The metal in the metal salts of boric acid containing salts of metals of Group II or Group IV of the Periodic Table is not particularly limited. Magnesium, calcium, zinc, strontium, barium, zirconium, and tin are preferable from the standpoint of the effect, toxicity, and availability, and calcium, zinc, and bariums are more preferable. Examples of the metal salt of boric acid include magnesium borate, calcium borate, zinc borate, strontium borate, barium borate, zirconium borate, tin borate, and the like. These compounds may be used singly or as a combination of two or more types. Examples of the zeolites include A-type zeolites represented by formula (II):

$$Na_2O\cdot Al_2O_3\cdot 2SiO_2\cdot kH_2O \qquad (II)$$

wherein k represents a number of 0 to 6. The A-type zeolites may be natural products or synthetic products. The A-type zeolites may be treated on the surface, for example, with an alkali metal salt of a higher fatty acid, such as an alkali metal salt of stearic acid or oleic acid, or a alkali metal salt of an organic sulfonic acid, such as an alkali metal salt of dodecylbenzenesulfonic acid.

The zeolites containing metals of Group II or Group IV of the Periodic Table are zeolites having the structure obtained by substituting Na in the above A-type zeolites with a metal of Group II or Group IV of the Periodic Table (hereinafter, referred to as metal-substituted zeolites). The metal for the substitution is not particularly limited. Magnesium, calcium, zinc, strontium, barium, zirconium, tin, and the like are preferable from the standpoint of the effect, toxicity, and availability, and calcium, zinc, and barium are more preferable.

The metal-substituted zeolite can be obtained from a zeolite containing an alkali metal by partially or entirely substituting the alkali metal with the above metal. It is preferable that a higher fraction of the alkali metal is substituted with the above metal. Generally, metal-substituted zeolites which can industrially easily obtained have a fraction of substitution of about 10 to 70%. Specific examples of the metal-substituted zeolite include zeolite substituted with magnesium, zeolite substituted with calcium, zeolite substituted with zinc, zeolite substituted with strontium, zeolite substituted with barium, zeolite substituted with zirconium, zeolite substituted with tin, and the like. Natural zeolites containing the above metals can also be used. The zeolite may be used singly or as a combination of two or more types.

Examples of the antioxidant include antioxidants of hindered phenols, such as 2,6-di-t-butyl-4-methylphenol, stearyl β-(3,5-di-t-butyl-4-hydroxyphenyl)propionate, triethylene glycol bis-3-(3t-butyl-4-hydroxy-5-methyl) phenylpropionate, and the like; and antioxidants containing phosphorus, such as tris(2,4-di-t-butylphenyl)phosphite, tetratridecyl- 4,4'-butylidenebis(3-methyl-6-t-butylphenyl) diphosphite, and the like.

As the light stabilizer, hindered amine compounds and benzotriazole compounds are preferably used. As the hindered amine compound, heterocyclic hindered amine compounds are preferable. The heterocyclic hindered amine compounds are compounds having a six-membered heterocyclic ring containing a nitrogen atom of a hindered amine and, optionally, another atom of a different type, preferably nitrogen atom or oxygen atom. Examples of the heterocyclic hindered amine include di-(2,2,6,6-tetramethyl-4-piperidyl) sebacate, 4-benzoyloxy-2,2,6,6-tetramethylpiperidine, compounds obtained from succinic acid and N-(2-hydroxyethyl)-2,2,6,6-tetramethyl-4-hydroxypiperidine, 1,2,3,4-tetra(2,2,6,6-tetramethyl-4-piperidyl) butanetetracarboxylate, 1,4-di-(2,2,6,6-tetramethyl-4-piperidyl)-2,3-butanedione, tris(2,2,6,6-tetramethyl-4-piperidyl)trimellitate, 1,2,2,6,6-pentamethyl-4-piperidyl stearate, 1,2,2,6,6-pentamethyl-4-piperidyl n-octoate, bis(1,2,6,6-pentamethyl-4-piperidyl)sebacate, tris(2,2,6,6-tetramethyl-4-piperidyl)nitrilacetate, 4-hydroxy -hydroxy-2,2,6,6-tetramethylpiperidine, 4-hydroxy-1,2,2,6,6-pentamethylpiperidine, and the like. Among these compounds, di(2,2,6,6-tetramethyl-4-piperidyl)sebacate and condensation products obtained from succinic acid and N-(2-hydroxyethyl)-2,2,6,6-tetramethyl-4-hydroxypiperidine are preferable.

Examples of the benzotriazole compound include (2'-hydroxy-5'-methylphenyl)benzotriazole, 2-(2'-hydroxy-5'-t-butylphenyl)benzotriazole, 2-(2'-hydroxy-5'-amylphenyl) benzotriazole, 2-(2'-hydroxy-4'-octoxyphenyl) benzotriazole,2-(2'-hydroxy-3',5'-di-t-butylphenyl) benzotriazole, 2-( 2'-hydroxy-3',5'-diisoamylphenyl) benzotriazole, 2-(2'-hydroxy-3',5'-dimethylphenyl) benzotriazole, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-3',5'-dimethylphenyl)-5-chlorobenzotriazole, 2-(2'-hydroxy-3',5'-dichlorophenyl) benzotriazole, and the like. Among these compounds, 2-(2'-hydroxy-5'-methylphenyl)benzotriazole is particularly preferable. Examples of the lubricant include stearic acid, behenic acid, zinc stearate, calcium stearate, magnesium stearate, ethylene-bis-stearoamide, and the like. Examples of the plasticizer include organic polysiloxanes, mineral oils, and the like.

Examples of the other thermoplastic resin include polyesters, such as polyethylene terephthalate, polybutylene terephthalate, polyethylene naphthalate, and the like; polythioethers, such as polyphenyl sulfide and the like; polyamides; polycarbonates; polyarylates; polysulfones; polyether ether ketones; polyether sulfones; polyimides; polyamide-imides; polymethyl methacrylate; ethylene-acrylic acid copolymers; vinyl chloride resins; fluorinated polyethylenes; polyacetals; thermoplastic polyurethane elastomers; 1,2-polybutadiene; styrene-maleic anhydride copolymers; and the like.

The resin composition used as the battery jar material of the present invention can be prepared by mixing specific amounts of the essential components described above and additional components which are optionally used, followed by sufficiently kneading the components at a suitable temperature, for example a temperature in the range of 270 to 320° C., by a Banbury mixer, a single screw extruder, a twin-screw extruder, a cokneader, a multi-screw extruder, or the like.

The battery jar for sealed secondary batteries of the present invention is obtained by preparing a case and a sealing plate from the resin composition obtained as described above by a conventional method, preferably injection molding, followed by attaching the sealing plate to the case. The battery jar may be heat treated after molding, where necessary, to improve heat resistance and to remove the residual stress. The heat treatment may be conducted in a conventional hot air oven, an electronic range, or an oven range. It is advantageous that the heat treatment is conducted at a temperature of about 130 to 260° C. for about 5 seconds to 300 minutes under an atmospheric pressure or a reduced pressure. The heat treatment may also be conducted in steam or hot water.

The battery jar thus obtained has a light weight, exhibits excellent chemical resistance (resistance to electrolytes), solvent resistance (resistance of oil and grease), heat resistance, electric insulation, and mechanical properties, shows no change in the shape under the condition of 60° C. and an inner pressure of 2 kg/cm$^2$ or the condition of 100° C. and an inner pressure of 1 kg/cm$^2$, and can be used for various types of sealed secondary battery.

The present invention is described in more detail with reference to examples in the following. However, the present invention is not limited by the examples.

Properties of a battery case were evaluated in accordance with the following methods.

Evaluation of Properties of a Battery Case
(1) Retention of the Shape

Change in the shape was observed under the condition of 60° C. and 2 atm and the condition of 100° C. and 1 atm, and the results were evaluated in accordance with the following criteria:

o: no change in the shape

Δ: some bulge x: marked change in the shape (2) Resistance to Oil and Grease

Into a vessel which was made of stainless steel, had an inner volume of 5 liter, and was equipped with a heater and a cover, battery cases prepared by using various types of resin were placed. The battery cases were dipped into gear oil (manufactured by IDEMITSU KOSAN Co., Ltd.; APPO-LOIL MISSION OIL) or grease (a silicone grease, a genuine product by NISSAN MOTOR Co., Ltd.) heated to 100° C. and kept there for 30 days. After the dipping for 30 days, the battery cases were evaluated with respect to the appearance and the change in the weight. The result of the evaluation is shown by a mark o when a battery case showed no change in the appearance and a change in the weight of 5% or less, by a mark Δ when a battery case showed some coloring or change in the shape, and by a mark x when a battery case showed melting or marked change in the shape.

Components used for the battery jar materials were as follows:

Component (A):
  SPS: polystyrene having the syndiotactic configuration which was obtained in Preparation Example 1

Component (B)
  Polyolefin
    PP: polypropylene; manufactured by IDEMITSU PETROCHEMICAL Co., Ltd.; IDEMITSU POLYPROPYLENE E-185G and E-150G
    PE: polyethylene; manufactured by IDEMITSU PETROCHEMICAL Co. Ltd.; IDEMITSU POLYETHYLENE 440P
    ABS: an acrylonitrile-butadiene-styrene copolymer; manufactured by DAICEL KAGAKU Co. Ltd.; ZEBIAN-V500
    EPR: ethylene-propylene rubber; manufactured by JAPAN SYNTHETIC RUBBER Co. Ltd.; JSR EP 07P
  Styrenic elastomer
    SEBS: a hydrogenated styrene-butadiene-styrene block copolymer; manufacture by SHELL JAPAN, Ltd., KRATON G1651; or manufactured by ASAHI CHEMICAL INDUSTRY CO. LTD., H1081

SEPS: a hydrogenated styrene-isoprene-styrene block copolymer; manufactured by KURARAY CO. LTD.; SEPTON 2104

Component (C)

PPE: a polyphenylene ether; manufactured by MITSUBISHI ENGINEERING PLASTICS Co. Ltd.; YPX-100L Component (D)

Glass fiber: manufactured by ASAHI FIBER GLASS Co., Ltd.: FT712

Component (E)

PPE modified with a polar group: a polyphenylene ether modified with maleic anhydride which was obtained in Preparation Example 2

PREPARATION EXAMPLE 1

Preparation of SPS

Into a 2 liter reactor, 1.0 liter of purified styrene and 1 mmol of triethylaluminum were placed. After the obtained mixture was heated to 80° C., 16.5 ml of a preliminarily mixed catalyst [containing 90 micromol of pentamethylcyclopentadienyltitanium trimethoxide, 90 micromol of dimethylanilinium tetrakis(pentafluorophenyl)borate, 29.1 mmol of toluene, and 1.8 mmol of triisobutylaluminum] was added to the mixture, and the polymerization was allowed to proceed at 80° C. for 5 hours. After the reaction was completed, the product was repeatedly washed with methanol and dried to obtain 380 g of a polymer.

The molecular weight of the obtained polymer was measured by the gel permeation chromatography at 130° C. using 1,2,4-trichlorobenzene as the solvent and found to be 320,000. The ratio of the weight-average molecular weigh to the number-average molecular weight was 2.60. Measurement of the melting point and measurement by $^{13}$C-NMR were conducted, and it was confirmed from the results that the obtained polymer was polystyrene having the syndiotactic configuration (SPS).

PREPARATION EXAMPLE 2

Preparation of a Polyphenylene Ether Modified With Maleic Anhydride

A polyphenylene ether (inherent viscosity, 0.45 dl/g in chloroform at 25° C.) in an amount of 1 kg, 30 g of fumaric acid, and 20 g of 2,3-dimethyl- 2,3-diphenylbutane [manufactured by NIPPON OIL and FAT Co., Ltd; NOFMER BC, a trade name] as the radical generating agent were dry blended and melt kneaded using a 30 mm twin-screw extruder at a rotation speed of screws of 200 rpm and a set temperature of 300° C. The temperature of the resin during the kneading was about 330° C. The obtained strands were cooled and pelletized to obtain a polyphenylene ether modified with fumaric acid. To obtain the degree of modification, 1 g of the obtained polyphenylene ether modified with fumaric acid was dissolved in ethylbenzene and then reprecipitated with methanol. The recovered polymer was extracted with methanol using a Soxhlet extractor and dried, and the degree of modification of the polymer was obtained from the intensity of the carbonyl absorption in the IR spectrum and the result of titration. The degree of modification was 1.5% by weight.

EXAMPLE 1

SPS obtained in Preparation Example 1 as component (A) in an amount of 80 parts by weight, 20 parts by weight of a hydrogenated styrene-butadiene-styrene copolymer [SEBS; manufactured by SHELL JAPAN Co., Ltd.; KRATON G1651] as component (B), and 0.3 parts by weight of bis(2,6-di-t-butyl-4-methylphenyl)pentaerythritol diphosphite (manufactured by ADEKA ARGUS Co., Ltd.; PEP-36) as the antioxidant were dry blended using a Henschel mixer and then melt kneaded using a twin-screw extruder (manufactured by TOSHIBA MACHINE Co., Ltd.; TEM-35) at a set cylinder temperature of 280° C. to prepare a resin composition. The prepared resin composition was pelletized to prepare a battery jar material.

Then, the prepared pellets were injection molded using IS-150E, manufactured by TOSHIBA MACHINE Co., Ltd., and a battery case having a thickness of 3 mm, a length of 108 mm, a width of 69 mm, and a height of 18 mm was prepared.

Resistance to oil and grease of the prepared battery case was evaluated. To the battery case, a sealing plate having a safety valve which was set to be activated at 2 atm was heat sealed to prepare a battery jar. Retention of the shape of the battery jar was evaluated. The results are shown in Table 2.

EXAMPLES 2 TO 7

Battery cases were prepared in accordance with the same procedures as those conducted in Example 1 using components of types shown in Table 1 in amounts also shown in Table 1 and 0.3 parts by weight of the antioxidant PEP-36. Resistance to oil and grease and retention of the shape of the prepared battery cases were evaluated. The results are shown in Table 2.

EXAMPLE 8

SPS obtained in Preparation Example 1 as component (A) in an amount of 90 parts by weight, 10 parts by weight of KRATON G1651 as component (B), 2 parts by weight of the polyphenylene ether modified with maleic anhydride (acid-modified PPE) which was obtained in Preparation Example 2 as component E, and 0.3 parts by weight of PEP-36 as the antioxidant were dry blended using a Henschel mixer and then melt kneaded using a twin-screw extruder (manufactured by TOSHIBA MACHINE Co., Ltd.; TEM-35) at a set cylinder temperature of 280° C. while 43 parts by weight of glass fiber (manufactured by ASAHI FIBER GLASS Co., Ltd.; FT712) was side fed at an intermediate position of the extruder to prepare a resin composition. The prepared resin composition was pelletized to prepare a battery jar material.

Then, a battery case was prepared using the prepared pellets in accordance with the same procedures as those conducted in Example 1. Resistance to oil and grease and retention of the shape of the prepared battery case were evaluated. The results are shown in Table 2.

EXAMPLES 9 AND 10

Battery cases were prepared in accordance with the same procedures as those conducted in Example 8 using components of types shown in Table 1 in amounts also shown in Table 1 and 0.3 parts by weight of the antioxidant PEP-36. Resistance to oil and grease and retention of the shape of the prepared battery cases were evaluated. The results are shown in Table 2.

COMPARATIVE EXAMPLES 1 TO 6

Battery cases were prepared in accordance with the same procedures as those conducted in Example 1 using components of types shown in Table 1 in amounts also shown in Table 1 and 0.3 parts by weight of the antioxidant PEP-36. Resistance to oil and grease and retention of the shape of the prepared battery cases were evaluated. The results are shown in Table 2.

COMPARATIVE EXAMPLE 7

A battery case was prepared in accordance with the same procedures as those conducted in Example 8 using components of types shown in Table 1 in amounts also shown in Table 1 and 0.3 parts by weight of the antioxidant PEP-36. Resistance to oil and grease and retention of the shape of the prepared battery case were evaluated. The results are shown in Table 2.

TABLE 1-1

| | component (A) | component (B) | |
|---|---|---|---|
| | SPS | type | amount |
| Example 1 | 80 | KRATON G1651 (SEBS) | 20 |
| Example 2 | 76 | KRATON G1651 (SEBS) | 20 |
| Example 3 | 80 | JSR EP07P (EPR) | 16 |
| | | H1081 (SEBS) | 4 |
| Example 4 | 80 | IDEMITSU POLYPROPYLENE E-185G (PP) | 16 |
| | | H1081 (SEBS) | 4 |
| Example 5 | 95 | KRATON G1651 (SEBS) | 5 |
| Example 6 | 50 | KRATON G1651 (SEBS) | 50 |
| Example 7 | 80 | SEPTON 2104 (SEPS) | 20 |
| Example 8 | 90 | KRATON G1651 (SEBS) | 10 |
| Example 9 | 90 | JSR EP07P (EPR) | 8 |
| | | H1081 (SEBS) | 2 |
| Example 10 | 90 | IDEMITSU POLYPROPYLENE E-185G (PP) | 8 |
| | | H1081 (SEBS) | 2 |
| Comparative Example 1 | 40 | KRATON G1651 (SEBS) | 60 |
| Comparative Example 2 | 40 | JSR EP07P (EPR) | 48 |
| | | H1081 (SEBS) | 12 |
| Comparative Example 3 | 40 | IDEMITSU POLYPROPYLENE E-185G (PP) | 48 |
| | | H1081 (SEBS) | 12 |
| Comparative Example 4 | — | IDEMITSU POLYPROPYLENE E-150G (PP) | 100 |
| Comparative Example 5 | — | IDEMITSU POLYETHYLENE 440P (PE) | 100 |
| Comparative Example 6 | — | ZEBIAN (ABS) | 100 |
| Comparative Example 7 | 40 | KRATON G1651 (SEBS) | 60 |

TABLE 1-2

| | amounts of components (parts by weight) | | |
|---|---|---|---|
| | component (C) PPE | component (D) glass fiber | component (E) modified PPE |
| Example 1 | — | — | — |
| Example 2 | 4 | — | — |
| Example 3 | — | — | — |
| Example 4 | — | — | — |
| Example 5 | — | — | — |
| Example 6 | — | — | — |
| Example 7 | — | — | — |
| Example 8 | — | 48 | 2 |
| Example 9 | — | 43 | 2 |
| Example 10 | — | 43 | 2 |
| Comparative Example 1 | — | — | — |
| Comparative Example 2 | — | — | — |
| Comparative Example 3 | — | — | — |
| Comparative Example 4 | — | — | — |
| Comparative Example 5 | — | — | — |
| Comparative Example 6 | — | — | — |
| Comparative Example 7 | — | 43 | 2 |

TABLE 2

| | battery case | | |
|---|---|---|---|
| | retention of the shape | | resistance to oil and |
| | 60° C., 2 atm | 100° C., 1 atm | grease (100° C.) |
| Example 1 | ◯ | ◯ | ◯ |

TABLE 2-continued

| | battery case | | |
|---|---|---|---|
| | retention of the shape | | resistance to oil and |
| | 60° C., 2 atm | 100° C., 1 atm | grease (100° C.) |
| Example 2 | ○ | ○ | ○ |
| Example 3 | ○ | ○ | ○ |
| Example 4 | ○ | ○ | ○ |
| Example 5 | ○ | ○ | ○ |
| Example 6 | ○ | ○ | ○ |
| Example 7 | ○ | ○ | ○ |
| Example 8 | ○ | ○ | ○ |
| Example 9 | ○ | ○ | ○ |
| Example 10 | ○ | ○ | ○ |
| Comparative Example 1 | x | x | x |
| Comparative Example 2 | x | x | x |
| Comparative Example 3 | Δ | x | x |
| Comparative Example 4 | Δ | Δ | x |
| Comparative Example 5 | x | x | x |
| Comparative Example 6 | ○ | x | x |
| Comparative Example 7 | Δ | x | x |

INDUSTRIAL APPLICABILITY

The battery jar material for sealed secondary batteries of the present invention enables decrease in the thickness because of excellent moldability and provides a battery jar which has a light weight, exhibits excellent chemical resistance (resistance to electrolytes), solvent resistance (resistance to oil and grease), heat resistance, electric insulation, and mechanical properties, endures severe service conditions, and shows no change in the shape under increased heat and inner pressure at the time of rapid charge.

In sealed secondary alkali batteries, expansion and contraction of an anode take place at the time of charge and discharge to cause expansion and contraction, respectively, of the battery jar. Moreover, gases are generated during charge, and an inner pressure arises to the maximum of about 2 kg/cm$^2$. When a battery is used for an electric automobile, the temperature is increased almost to 100° C. during driving on outdoor surfaces. Therefore, battery jars made of polystyrene, an ABS resin, an AS resin, or the like cannot retain the shape under these conditions. When tensile strengths of various resins at 60° C. are compared, tensile strength of polypropylene is about 140 kg/cm$^2$, and tensile strength of poly-4-methylpentene-1 is about 170 kg/cm$^2$. In contrast, tensile strength of the material comprising SPS and SEBS in a ratio by weight of 80/20, which is used in the present invention, is about 250 kg/cm$^2$ (measured in accordance with the method of Japanese Industrial Standard K 7113). Therefore, this material shows little deformation and enables decrease in the thickness.

We claim:

1. A battery jar for sealed secondary batteries made from a resin composition which comprises 50 to 98% by weight of (A) a styrenic polymer having a syndiotactic configuration, 2 to 50% by weight of (B) at least one polymer selected from the group consisting of polyolefins and styrenic elastomers, and 0 to 10% by weight of (C) a polyphenylene ether, wherein said battery jar retains its shape when subjected to a temperature of 60° C. and an inner pressure of 2 kg/cm$^2$ or a temperature of 100° C. and an inner pressure of 1 kg/cm$^2$ and wherein said battery jar retains its shape and exhibits no more than a 5% weight loss when immersed in oil or grease and retained therein for 30 days at 100° C.

2. A battery jar for sealed secondary batteries made from a resin composition which comprises 100 parts by weight of a resin component comprising 50 to 98% by weight of (A) a styrenic polymer having a syndiotactic configuration, 2 to 50% by weight of (B) at least one polymer selected from the group consisting of polyolefins and styrenic elastomers, and 0 to 10% by weight of (C) a polyphenylene ether; 1 to 350 parts by weight of (D) an inorganic filler; and 0 to 5 parts by weight of (E) a polyphenylene ether modified with a polar group, wherein said battery jar retains its shape when subjected to a temperature of 60° C. and an inner pressure of 2 kg/cm$^2$ or a temperature of 100° C. and an inner pressure of 1 kg/cm$^2$ and wherein said battery jar retains its shape and exhibits no more than a 5% weight loss when immersed in oil or grease and retained therein for 30 days at 100° C.

3. A battery jar according to claim 1, wherein component (B) is at least one polymer selected from polypropylene, polyethylene, ethylene-propylene rubber, ethylene-propylene-diene rubber, hydrogenated styrene-butadiene-styrene block copolymers, hydrogenated styrene-butadiene-ethylene block copolymers, and hydrogenated styrene-isoprene-ethylene block copolymers.

4. A battery jar according to claim 2, wherein component (B) is at least one polymer selected from polypropylene, polyethylene, ethylene-propylene rubber, ethylene-propylene-diene rubber, hydrogenated styrene-butadiene-styrene block copolymers, hydrogenated styrene-butadiene-ethylene block copolymers, and hydrogenated styrene-isoprene-ethylene block copolymers.

5. A battery jar according to claim 2, wherein component (D) is a glass fiber.

6. In a sealed secondary battery including electrodes, electrolyte, a battery jar and a sealing plate, the improvement wherein the battery jar is made from a resin composition which comprises 50 to 98% by weight of (A) a styrenic polymer having a syndiotactic configuration, 2 to 50% by weight of (B) at least one polymer selected from the group consisting of polyolefins and styrenic elastomers, and 0 to 10% by weight of (C) a polyphenylene ether, wherein said battery jar retains its shape when subjected to a temperature of 60° C. and an inner pressure of 2 kg/cm$^2$ or a temperature of 100° C. and an inner pressure of 1 kg/cm$^2$ and wherein the battery jar retains its shape and exhibits no more than a 5% weight loss when immersed in oil or grease and retained therein for 30 days at 100° C.

7. In a sealed secondary battery including electrodes, electrolyte, a battery jar and a sealing plate, the improvement wherein the battery jar is made from a resin composition which comprises 100 parts by weight of a resin component comprising 50 to 98% by weight of (A) a styrenic polymer having a syndiotactic configuration, 2 to 50% by weight of (B) at least one polymer selected from the group consisting of polyolefins and styrenic elastomers, and 0 to 10% by weight of (C) a polyphenylene ether; 1 to 350 parts by weight of (D) an inorganic filler; and 0 to 5 parts by weight of (E) a polyphenylene ether modified with a polar group, wherein said battery jar retains its shape when subjected to a temperature of 60° C. and an inner pressure of 2 kg/cm$^2$ or a temperature of 100° C. and an inner pressure of 1 kg/cm$^2$ and wherein the battery jar retains its shape and exhibits no more than a 5% weight loss when immersed in oil or grease and retained therein for 30 days at 100° C.

8. A sealed secondary battery according to claim 6, wherein component (B) is at least one polymer selected from polypropylene, polyethylene, ethylene-propylene rubber, ethylene-propylene-diene rubber, hydrogenated styrene-butadiene-styrene block copolymers, hydrogenated styrene-butadiene-ethylene block copolymers, and hydrogenated styrene-isoprene-ethylene block copolymers.

9. A sealed secondary battery according to claim 7, wherein component (B) is at least one polymer selected from polypropylene, polyethylene, ethylene-propylene rubber, ethylene-propylene-diene rubber, hydrogenated styrene-butadiene-styrene block copolymers, hydrogenated styrene-butadiene-ethylene block copolymers, and hydrogenated styrene-isoprene-ethylene block copolymers.

10. A sealed secondary battery according to claim 7, wherein component (D) is glass fiber.

* * * * *